Patented Apr. 3, 1951

2,547,822

UNITED STATES PATENT OFFICE 2,547,822

FUMIGANT COMPOSITION OF ACTIVATED SILICA GEL AND DIHALO-ALKENE

Julius E. Johnson, Jr., Midland, and Dorsey R. Mussell, Clare, Mich., assignors to The Dow Chemical Company, Midland, Mich., a corporation of Delaware No Drawing. Application September 6, 1947, Serial No. 772,590

6 Claims. (Cl. 167—42)

This invention relates to fumigants and is particularly directed to a new composition of matter and a method for its application to control undesirable organisms normally present in top soil and litter.

The application of fumigant materials for the control of soil organisms affords a new method of sanitation for the livestock and poultry industry. Coccidiosis in chickens and other parasite induced maladies of both poultry and domestic animals can be largely prevented by the timely and proper application of fumigant compositions to infected soil and litter.

The utilization of these control methods is hampered by the toxic and disagreeable characteristics of many fumigant materials, and the failure of existing methods and materials to accomplish a satisfactory control of infective stages of organisms located on or near the surface of the soil. This latter shortcoming creates a special difficulty in soil fumigation since organisms so located are those normally contacted by poultry and animals. Many of the common organic fumigants in conventional application, escape by volatilization before toxic concentrations are established at the point of infection, unless special steps are taken to blanket the treated surfaces.

Recent investigations indicate the superiority of certain dihalo-alkenes as fumigant materials for the control of soil dwelling organisms. As a class, these compounds are highly volatile lachrymators of considerable toxicity to both humans and animals. The possibility of vapor inhalation, skin absorption, and skin irritation render the application of these fumigants in accordance with usual drilling injection, spraying, and atomizing technics most hazardous except as gas masks, vapor resistant clothing, and highly specialized equipment are employed.

It is an object of the present invention to provide a new fumigant composition in which the toxic hazards of the effective ingredient will be materially reduced. A further object is to supply a fumigant mixture in such form that a given amount of toxic ingredient will be more potent against soil organisms than would be the case in mixtures of conventional type. An additional object is to provide a such composition which will be effective in controlling organisms located on or near the surface of soil and litter and which are frequently not controlled by application of known fumigant products. Another object is to provide a product characterized by ease of handling, packaging and shipping, and which will not require special equipment and care in application. A still further object is the provision of a method for the control of soil and litter infesting organisms which will avoid the necessity of sealing, covering, or blanketing the surfaces of the treated soil or litter as at present practiced to prevent the too rapid dissipation of the fumigant. Other objects will become evident from the following specification and claims.

According to the present invention it has been discovered that an improved fumigant composition is obtained when a dihalo-alkene is adsorbed on activated silica gel. The resulting granular free-flowing product is adapted to be employed for the control of soil organisms generally, and particularly those commonly attacking poultry and domestic animals.

The dihalo-alkene employed in accordance with the present invention is one having the formula

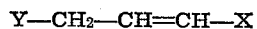

$$Y-CH_2-CH=CH-X$$

wherein Y is selected from the group consisting of chlorine and bromine, and X is selected from the group consisting of chlorine, bromine, chloromethyl and bromomethyl radicals.

The activated silica gel is preferably a product of particle size from about 4 to 200 screen mesh (Tyler Screen Series). These limits are relatively critical. A product of larger particle size is not adapted to uniform distribution in and through soil and litter. A more finely divided product loses the desirable granular characteristic. However, compositions including very finely divided material have restricted uses as, for example, in mixture with fertilizers or other finely divided soil conditioners.

The preparation of the new composition is readily accomplished by contacting the dihalo-alkene in either solid, liquid, or gaseous form with the activated silica gel in the described state of subdivision. Because of the toxic and irritating nature of certain of the dihalo-alkenes, this is conveniently accomplished in a closed reactor equipped with means for agitation or in a suitable container with shaking or rolling to provide for the production of a homogeneous mixture. The amount of dihalo-alkene employed is limited only by the adsorptive limits of the silica gel. It has been found that from about 5 to about 35 percent by weight of dihalo-alkene in the finished product is desirable. If more than 35 percent is employed, there may be a tendency for the liquid toxicant to stratify on storage. Less than this amount of toxicant is operable, but necessitates the use of such large amounts of silica gel as to be impractical.

The mixing of the dihalo-alkene with the activated silica gel results in the complete adsorption of the former in and on the surfaces of the latter. The dihalo-alkene is held so tightly in this combination that the toxic hazards normally characterizing the handling and application of these compounds are largely avoided.

A further feature of the present invention resides in the application of the new fumigant mixture for controlling infectious and parasitic soil organisms. A particular application is in the treatment of poultry and animal coops and runs, barnyards, and particularly, areas where droppings concentrate as around watering troughs and fountains, feeders, range shelters, etc.

According to this method, the composition is intimately dispersed in and through top soil and litter infested with the noxious organisms. This exposes the composition to the action of moisture in the soil and litter and of water vapor in the air. The activated silica gel is hydrophilic and adsorbs the moisture to effect a gradual displacement of the dihalo-alkene in the vapor state. The amount of the fumigant composition employed in any given operation is so selected that the vapors of dihalo-alkene displaced by water from the silica gel effect a concentration lethal to the organisms in the soil or litter.

The preferred mode of operation includes the dispersion of the fumigant mixture through the upper 2 or 3 inches of top soil or litter and in such amount that the active toxicant is present in a concentration of at least 0.5 gram per square foot of area under treatment. This amount of dihalo-alkene yields a vapor phase concentration which is toxic to organisms on and near the surface and which are frequently missed in fumigation operations.

The application is conveniently carried out by scattering the composition over the surface to be treated and thereafter disking or raking the composition into the soil or litter. Alternate procedures include drilling the granular free-flowing product into the soil, scattering a stream of the composition in the furrow to be covered by the succeeding furrow slice during plowing, and mixing the fumigant composition with conventional dry fertilizer materials to be dispersed in conventional manner.

One of the principal advantages of the present mode of operation is that the action of the toxicant persists for a greater period of time than with other fumigant products except as the application of the latter includes the step of blanketing the treated surface by soaking with water, covering with tarpaulins, etc. Accordingly, a reasonable time should elapse between application of the new composition and the utilization of the treated area. This permits the dissipation of the volatile ingredient and precludes injury to poultry or domestic animals by residual fumes. In the case of soil to be planted with an economic crop, reduction in germination of seeds or injury to seedlings is possible unless such waiting period is observed. The time elapsing between treatment of soil or litter and utilization of the treated surfaces should be from 8 hours to 10 days depending upon the crop to be planted, the concentration of dihalo-alkene in the fumigant composition, the state of subdivision of the silica gel, the amount of moisture available for displacement of the toxicant, the particular toxicant employed, and the amount of toxicant initially employed per square foot of area under treatment. Where animals or birds are to be confined over the treated areas, at least 16 hours should elapse between treatment and use.

Representative of the organisms which are susceptible to control with the new composition and in accordance with the method of the present invention are nematodes, trematodes, cestodes, protozoal organisms, and miscellaneous soil dwelling invertebrates. Specific organisms include coccidia *(Eimeria tenella)*, cecal worm eggs, liver flukes, ova of *Taenia cesticillus*, *Histomones meleagridis*, wire worms, earthworms, seed corn maggot, and onion maggot.

The following examples are not to be construed as limiting:

EXAMPLE 1

A series of determinations were carried out in which chickens were employed to determine the effectiveness of various fumigant compositions for the control of *Eimeria tenella*, the organism causing coccidiosis. In these operations the floor of each of a number of wooden brooders was spread 2 inches deep with soil, and the soil then contaminated by sprinkling with an aqueous suspension of sporulated oöcysts of *Eimeria tenella*, about 5 million oöcysts being applied per brooder. Several of the infected houses were not further treated, but were held as controls. Two to four hours later a number of the brooders were treated with fumigant compositions consisting of activated silica gel and 1,4-dibromo-2-butene. These applications were carried out by strewing the granular composition over the infected floor areas and then raking the material into the soil. The brooder houses were thereafter aired for 48 hours at the end of which time 2 to 3 weeks old chicks were confined in each brooder and feed was spread over the previously contaminated floor area to provide ample opportunity for the birds to pick up any remaining viable oöcysts. Four or five chickens were used in each brooder. After 24 hours of feeding from the floor of the brooders, a standard feeder was installed for the remainder of the determination. Seven days after exposure to the infected surfaces, the chicks were autopsied and examined for cecal lesions and the presence or absence of oöcysts in the cecal contents to determine the degree, if any, of coccidial infection. The following table is illustrative of the results obtained.

*Treating composition*

| Percent by Weight of 1,4-Dibromo-2-Butene | Particle Size, Activated Silica Gel | Grams of Toxicant per sq. ft. | Degree of Coccidial Infection in Autopsied Chickens |
|---|---|---|---|
| Control | None | 0 | Heavy infection and many oöcysts. Birds passed bloody droppings at end of 5th day. |
| 25 | 8–16 screen mesh | 0.5 | Presence of oöcysts doubtful. |
| 30 | 8–16 screen mesh | 1.0 | No trace of coccidial infection. |
| 30 | 8–16 screen mesh | 0.25 | Do. |
| 25 | 20–65 screen mesh | 1.0 | Do. |
| 25 | 20–65 screen mesh | 0.5 | Presence of oöcysts doubtful. |
| 30 | 20–65 screen mesh | 0.5 | No trace of coccidial infection. |
| 30 | <100 screen mesh | 0.5 | Do. |
| 30 | <100 screen mesh | 0.25 | Do. |

In the foregoing table, the absence of evidence of coccidial infection on autopsy of the birds, was construed as indicative of a substantial control of the organism by the fumigant composition.

EXAMPLE 2

A similar operation was carried out in which the wooden brooders were floored with a 2-inch mat of cane litter. The details of the contamination with an aqueous dispersion of sporulated oöcysts and subsequent treatment with the activated silica gel fumigant mixtures are substantially as described in Example 1. Compositions containing 20 and 25 percent by weight of 1,4-dibromo-2-butene on activated silica gel of 28-65 mesh particle size were applied to the infected litter at the rate of 1.0 gram of 1,4-dibromo-2-butene per square foot of area under treatment. These operations gave 100 percent control based on the observation of the cecal contents of autopsied birds 7 days after feeding on the contaminated surfaces. As in Example 1, birds permitted to feed upon the untreated litter in control brooders showed bloody droppings within 5 days of feeding and heavy coccidial infection, coupled with many fatalities.

EXAMPLE 3

A 1-bromo-4-chloro-2-butene product was employed as described for 1,4-dibromo-2-butene in Example 2. Representative results were obtained with the composition of 10 percent by weight bromochloro-2-butene in an activated silica gel carrier of particle size smaller than 100 screen mesh and running as small as 325 screen mesh. This composition, when employed for the treatment of litter on the floor of wooden brooders, gave complete control of coccidial infection at 1.0 and 0.5 gram of toxicant per square foot of treated area. At 0.25 gram of toxicant per square foot a substantially complete control was obtained with no identifiable oöcysts recoverable from the cecal contents of autopsied birds. Birds from the untreated houses again showed heavy infection on autopsy, and the usual bloody droppings.

EXAMPLE 4

Similar results were obtained with a composition including 10 percent of 1,4-dichloro-2-butene adsorbed on activated silica gel of 28-200 screen mesh particle size. This mixture was not quite as effective as either the 1,4-dibromo-2-butene or chlorobromo-2-butene. However, the treatment of infected litter with sufficient of the composition to give a concentration of 1.0 gram of toxicant per square foot of floor area treated, gave a substantial control with very light evidence of infection and 100 percent survival of the chickens exposed to and feeding from the treated surfaces.

EXAMPLE 5

90 parts by weight of activated silica gel of particle size from 28 to 200 screen mesh and 10 parts by weight of a mixture of 80 percent of 1,3-dichloro-propene and 20 percent 1,3-dichloropropane were mixed together to obtain a granular free-flowing fumigant composition in which the propene-propane product was adsorbed on the silica gel. This composition is employed in an amount to yield from about 20 to 40 pounds of propene-propane product per acre for the control of nematodes. In such operation, the mixture is conveniently scattered over the surface of the infected soil, and disked into the soil to a depth of approximately 3 inches. An excellent control of nematodes is thereby obtained.

EXAMPLE 6

10 parts by weight of 1,3-dibromo-propene was dispersed in and on 90 parts of activated silica gel of particle size from 28 to 200 screen mesh. This product was employed substantially as described in Example 2 for the treatment of cane litter previously contaminated with an aqueous dispersion of sporulated oöcysts of *Eimeria tenella*. 100 percent control of coccidial infection was obtained when the fumigant composition was applied at the rate of from 0.5 to 1.0 gram of 1,3-dibromo-propene per square foot of area under treatment. Birds from the untreated houses showed heavy infection on autopsy, and the usual bloody droppings.

The chlorobromo-2-butene composition as employed in Example 3 consists principally of 1-bromo-4-chloro-2-butene. This compound is the subject matter of a co-pending application Serial No. 772,589, filed concurrently herewith in the names of Julius E. Johnson, Jr., and Fred Lowell Taylor. The compound may be prepared by reacting a substantial equimolecular mixture of bromine and chlorine with butadiene. In a representative operation 1575 grams of bromine and 700 grams of chlorine are dissolved in 2000 grams of cold carbon tetrachloride. The resulting solution is added portionwise and with stirring to a semisaturated solution of 1,3-butadiene, in 2000 grams of carbon tetrachloride at 8°-10° C. Gaseous butadiene is bubbled into the reaction mixture during the addition of the solution of mixed halogens, a total of 1127 grams of butadiene being added over the 3 hours required for the addition of the halogen solution. The temperature of the reaction mixture is maintained at 8°-10° C. by means of an ice-salt bath, throughout the operation.

The crude product is fractionally distilled to separate the solvent and thereafter distilled under reduced pressure to recover 2060 grams of a chlorobromo-2-butene fraction boiling at 90°-115° C. at 50 millimeters pressure and consisting principally of 1-bromo-4-chloro-2-butene.

We claim:

1. A granular free-flowing fumigant composition comprising as an active toxicant a dihaloalkene having the formula $$Y-CH_2-CH=CH-X$$

wherein Y is selected from the group consisting of chlorine and bromine, and X is selected from the group consisting of chlorine, bromine, chloromethyl and bromomethyl radicals, adsorbed on activated silica gel of particle size from 4 to 200 screen mesh (Tyler Screen Series).

2. A granular free-flowing fumigant composition comprising 1,4-dibromo-2-butene adsorbed on activated silica gel of particle size from 4 to 200 screen mesh (Tyler Screen Series).

3. A granular free-flowing fumigant composition comprising 1-bromo-4-chloro-2-butene adsorbed on activated silica gel of particle size from 4 to 200 screen mesh (Tyler Screen Series).

4. A granular free-flowing fumigant composition comprising 1,3-dichloro-propene adsorbed on activated silica gel of particle size from 4 to 200 screen mesh (Tyler Screen Series).

5. A granular free-flowing fumigant composition comprising from 5 to 35 percent by weight of 1,4-dibromo-2-butene adsorbed on activated silica gel of particle size from 4 to 200 screen mesh (Tyler Screen Series).

6. A granular free-flowing fumigant composition comprising from 5 to 35 percent by weight of a dihalo-alkene having the formula $$Y-CH_2-CH=CH-X$$

wherein Y is selected from the group consisting of chlorine and bromine, and X is selected from the group consisting of chlorine, bromine, chloromethyl, and bromomethyl radicals, adsorbed on activated silica gel of particle size from 4 to 200 screen mesh (Tyler Screen Series), and characterized by stability on storage and handling and the ability to release the dihalo-alkene in vapor form on contact with moisture.

JULIUS E. JOHNSON, JR.
DORSEY R. MUSSELL.

REFERENCES CITED

The following references are of record in the file of this patent:

UNITED STATES PATENTS

| Number | Name | Date |
|---|---|---|
| 2,057,044 | Meisenberg et al. | Oct. 13, 1936 |
| 2,207,737 | Hooft et al. | July 16, 1940 |
| 2,424,520 | Tonkin | July 22, 1947 |

FOREIGN PATENTS

| Number | Country | Date |
|---|---|---|
| 348,184 | Great Britain | May 8, 1931 |

OTHER REFERENCES

Committee on Med. Research of the Off. of Scientific Res. and Devel., Bimonthly Progress Report No. 24—Sec. 2, Contract No. OEMCMR M—4331 RS/B 49—202, June 30, 1945, pages 1 and 2.